Figure 1:
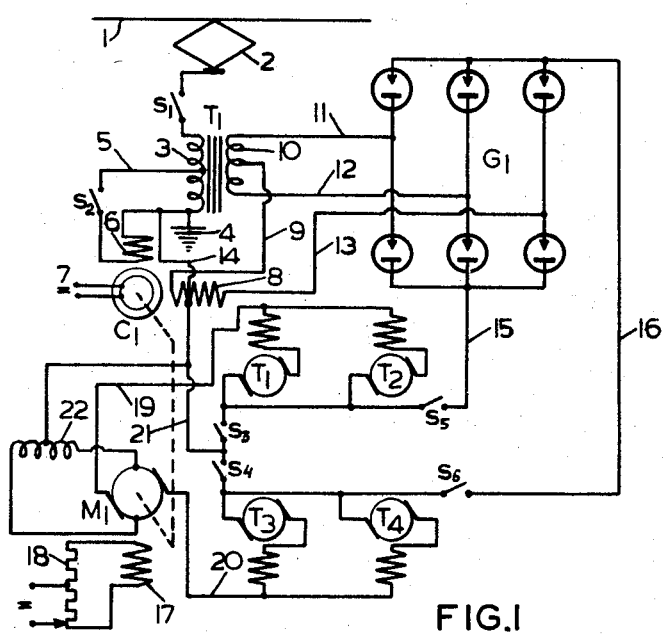

United States Patent Office 2,796,573
Patented June 18, 1957

2,796,573

SINGLE-PHASE ALTERNATING CURRENT FED DRIVING ARRANGEMENT FOR ELECTRIC TRACTION PURPOSES

Willem C. Korthals Altes, Amsterdam, Netherlands, assignor to "Mijnssen & Co. N. V.," Amsterdam, Netherlands, a company of the Netherlands Application February 15, 1955, Serial No. 488,349

Claims priority, application Netherlands February 20, 1954

6 Claims. (Cl. 318—343)

The invention pertains to a single-phase alternating current fed driving arrangement for electric traction purposes in which alternating current of high tension received from the power supply circuit after transformation to a lower voltage is converted into direct-current which is fed to one or more groups of direct-current traction motors. Such an arrangement, when properly designed, has the advantage that on the one hand an alternating current power supply of the normal frequency of 50 or 60 cycles and of high tension may be used, while on the other hand direct-current series motors with their favourable characteristics for traction can be employed.

Up to now two systems of such alternating-current fed direct-current driven locomotives can be distinguished.

In the one system the alternating-current is converted by means of a motor-generator set and in the other system by means of a rectifier arrangement, for instance a number of ignitron-rectifiers.

When comparing these two systems, it appears that the first mentioned system has the advantage of a simple speed control by regulation of the field of the direct-current generator of the motor-generator set but has a greater weight and a smaller efficiency. The second system, however, requires for the speed control a heavy and costly transformer equipped with an elaborate tap changing device for regulating the voltage of the rectifier. Furthermore, the rectified voltage resulting from the two-phase rectifier is pulsating and makes it necessary to install bulky smoothing reactors which, moreover, have an unfavourable effect on the nature of the current drawn from the line, causing the flow of higher harmonics.

The invention, while employing a rectifier arrangement, aims at avoiding the drawbacks of the known system of this type while combining the advantages of both systems.

To attain this object, the arrangement according to the invention comprises at least one rotary phase converter fed by the main transformer and having the terminals of its phase-shifting winding or windings combined with the secondary terminals of the transformer to constitute a polyphase current supply system feeding a polyphase rectifier arrangement which converter is mechanically coupled with at least one direct-current machine provided with voltage regulating means, switch means being provided allowing the rectifier arrangement and direct-current machine to be connected in series across the group or groups of direct-current traction motors.

Because of the polyphase rectifier arrangement the rectified voltage has only a small ripple obviating the necessity of providing heavy smoothing reactors. Furthermore, no tap changing device is needed on the transformer, because the rectifier arrangement has only to provide a constant voltage, speed control being obtained by regulating the voltage of the direct-current machine, for instance by means of a simple rheostat in its excitation circuit. This machine has only to furnish part of the full-load voltage of the traction motors and is, therefore, considerably smaller than the generator of a conventional system with motor-generator set of similar power. In this way, a substantial economy in weight as compared with the two known systems described above, is obtained. Moreover, regenerative dynamic braking remains possible within the range of the converter-direct current machine set, without the need of operating the rectifier as an inverter. The wave shape of the current in the supply line is not materially deformed but will substantially follow the shape of the supply voltage.

The phase converter may be asynchronous and be built as a simple squirrel cage induction motor which simplifies the starting and makes it possible in case of voltage-interruptions to have the converters started up without any manipulations on the part of the motorman. In case a more favourable power factor is required, however, it is also possible to use a phase-converter of the synchronous type.

Preferably, the arrangement according to the invention is such that the output voltage of the direct-current machine can be regulated from zero to maximum in two directions, thereby raising or lowering the constant direct-current voltage of the rectifier arrangement when connected in series therewith. According to an embodiment of the invention, the constant rectifier output voltage equals two-thirds of the full-load voltage of the traction motors and the maximum voltage of the direct-current machine equals one-third of said full-load voltage, the arrangement being such that between zero and one-third of their full-load voltage the traction motors are fed only by the direct-current machine operating as generator, whereupon by series connecting the rectifier arrangement in opposition to the direct-current machine the voltage across the traction motors can be raised from one-third to two-thirds of their full-load voltage by decreasing the opposing voltage of the direct-current machine operating as motor, whereafter by raising the voltage of the direct-current machine in the opposite sense, this machine again operating as generator, the full-load voltage of the traction motors can be obtained. In this way the direct-current machine or machines need be dimensioned only for one-third of the full-load power of the traction motors while nevertheless a continuous regulation without transformer taps is possible.

Figure 2:
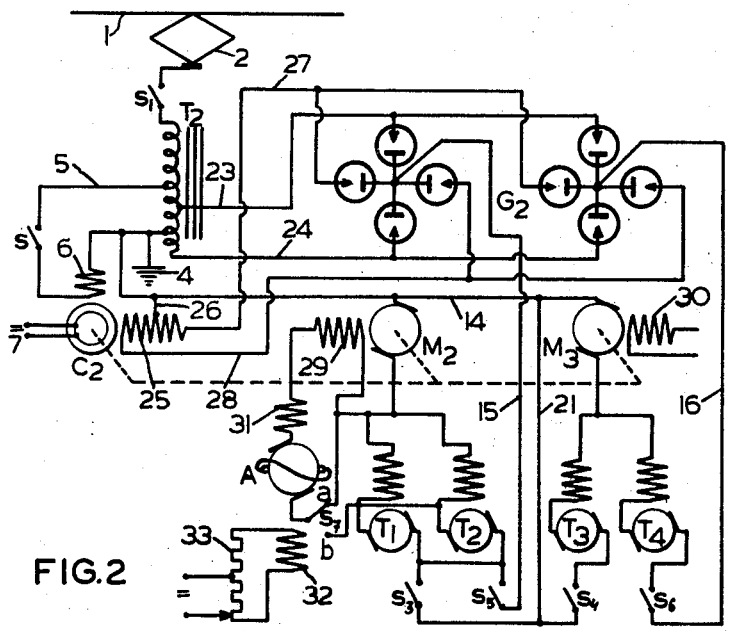

Other features and advantages of the arrangement according to the invention will be apparent from the following description and claims in conjunction with the accompanying drawings schematically showing in the Figures 1 and 2 embodiments of the invention. In these figures similar components have been indicated by the same reference numerals.

Referring to the embodiment of Figure 1, alternating current of, for instance, 20,000 v. drawn by a panthograph 2 from the aerial contact line 1 is fed through a main circuit breaker S₁ to the primary winding 3 of a transformer T₁ which primary transformer winding has its other terminal grounded by way of the locomotive wheels and rails at 4.

The winding 3 is provided with a tap connected by the line 5 and switch S₂ to the primary stator winding 6 of a synchronous phase-converter C₁. The stator winding 6 is grounded at its other end, the primary transformer winding 3 thus operating as an autotransformer feeding current of high tension to the converter C₁. The rotor winding of the converter is excited by a source of direct current 7.

The stator of the phase converter C₁ carries a second, low voltage winding 8 displaced by 90 electrical degrees with respect to the winding 6. Winding 8 is connected at one end by the line 9 to a point midway of the secondary winding 10 of the transformer T1 and is further so dimensioned that at the terminals 11, 12 and 13 of the two windings 8 and 10 thus combined, a three phase system is obtained in the manner of the well known Scott connection. The neutral point of this three phase system is grounded through the line 14.

The lines 11, 12 and 13 feed a three-phase rectifier arrangement $G_1$ consisting of two interconnected groups of three rectifier units, e. g. ignitrons, in star connection so as to obtain a full-wave three-phase rectification in the known manner. The constant output voltage of the rectifier arrangement is 1000 v. and is fed through the lines 15 and 16 containing switches $S_5$ and $S_6$ to two pairs of direct current series traction motors $T_1$, $T_2$ and $T_3$, $T_4$, respectively, connected two and two in parallel, each pair thus receiving 500 v. when the switches $S_5$ and $S_6$ are closed. The motors $T_1$–$T_4$ are dimensioned for a full-load voltage of 750 v. each.

The synchronous phase converter $C_1$ is mechanically coupled with a three-wire direct-current machine $M_1$ having a field coil 17 fed from an independent source of direct current through a rheostat 18 with a fixed center tap. By adjustment of the rheostat the voltage of the machine $M_1$ can be regulated in both directions from zero to the maximum voltage of 500 v.

The brushes of the machine $M_1$ are connected by the lines 19 and 20 to the two groups of traction motors $T_1$, $T_2$ and $T_3$, $T_4$, respectively, which groups are directly connected by a line containing two switches $S_3$ and $S_4$. The machine $M_1$ has a neutral line 21 tapping of midway from a high reactance coil 22 connected through sliprings across diametrically opposed points on the armature of the machine. The line 21 is grounded by an extension of the line 14 and leads to a point between the switches $S_3$ and $S_4$ so that, when both these switches are closed, the machine $M_1$ can furnish a maximum voltage of 250 v. for each of the two groups of traction motors $T_1$, $T_2$ and $T_3$, $T_4$, respectively.

The described arrangement operates as follows:

After closing the circuit breaker $S_1$ and the switch $S_2$ (the switches $S_3$—$S_6$ being open), the synchronous converter $C_1$ is started by known means not shown in the drawing, such as an auxiliary starting winding on the stator, a starting motor or by temporarily feeding direct current to the machine $M_1$. When the phase converter has reached synchronous speed, the switches $S_3$ and $S_4$ are closed and the excitation of the machine $M_1$ is gradually increased from zero to maximum by means of the rheostat 18. In this stage the converter $C_1$ functions as a motor driving the machine $M_1$ operating as a direct current generator. The two traction motor groups $T_1$, $T_2$ and $T_3$, $T_4$ only receive current from the machine $M_1$, the voltage rising from zero to the maximum of 250 v. per group, i. e. to one third of their voltage at full lead, the arrangement being such that the positive brush of the machine $M_1$ is connected to the motors $T_1$, $T_2$ and the negative brush to the motors $T_3$, $T_4$.

Next, the switches $S_3$, $S_4$ are opened and the switches $S_5$, $S_6$ closed whereby the two groups of traction motors are connected in series between the fixed voltage of 1000 v. of the rectifier arrangement $G_1$ and the opposed maximum voltage of the machine $M_1$. The voltage across each group of traction motors remains, therefore, the same at the absolute value of 250 v. but the direction of the current is reversed which, however, for a series motor does not entail a change in torque. The machine $M_1$ now operates as a motor, whereas the converter $C_1$ through its low voltage winding 8 feeds current to the rectifier ararngement $G_1$. By weakening the field of the machine $M_1$ by means of the rheostate 18, the opposing voltage of this machine can be gradually decreased to zero whereby the voltage across each group of traction motors is raised to 500 v., i. e. to two-thirds of their full-load voltage.

Finally, by reversing and again gradually increasing the excitation of the machine $M_1$ from zero to maximum, the voltage across each group of traction motors can be raised to 750 v., the voltage of the rectifier arrangement $G_1$ and that of the machine $M_1$, again operating as a generator, now having the same direction. In this stage, the converter C feeds mechanical power to the machine $M_1$ and electric power to the rectifier arrangement.

The embodiment of Figure 2 has a four-phase full-wave rectifier arrangement $G_2$ constituted by two groups of four ignitrons connected in the known manner and feeding two groups of parallel traction motors $T_1$, $T_2$ and $T_3$, $T_4$, respectively, through the lines 15 and 16 when the switches $S_5$ and $S_6$ in these lines are closed. The constant voltage of each of the output lines 15 and 16 to neutral again amounts to two-third of the full-load voltage of the traction motors.

Two phases of the rectifier arrangement $G_2$ are fed by the taps 23 and 24 and an autotransformer $T_2$ drawing current from the aerial contact line 1. The transformer $T_2$ is grounded at a point midway between the taps 23 and 24 and through the line 5 feeds the high tension stator winding 6 of a synchronous phase converter $C_2$. This converter has low tension stator windings 25 grounded midway at 26 which are phase-shifted with respect to the winding 6 in such a way as to obtain a symmetrical four-phase system in combination with the taps 23 and 24, the lines 27 and 28 connected to the terminals of the windings 25 feeding the other two phases of the four-phase rectifier arrangement $G_2$.

The converter $C_2$ is mechanically coupled with two direct-current machines $M_2$ and $M_3$ which are connected with terminals of opposite polarity to the grounded line 14 and to the traction motors $T_1$, $T_2$ and $T_3$, $T_4$, respectively. The two groups of traction motors on their other side can be connected by means of the switches $S_3$ and $S_4$, respectively, and the line 21 to the neutral line 14. The voltage of the machines $M_2$ and $M_3$ can be regulated in two directions from zero to one-third of the full-load voltage of the traction motors by corresponding regulation of the excitation of their field coils 29 and 30, so that in combination with proper manipulation of the switches $S_3$—$S_6$, the arrangement of Figure 2 operates in a similar way as above described with respect to Figure 1, the machines $M_2$ and $M_3$ at the outset upon the closing of the switches $S_3$ and $S_4$ as generators feeding the traction motors and, after opening the switches $S_3$, $S_4$ while closing the switches $S_5$, $S_6$, first opposing the fixed voltage of the rectifier arrangement $G_2$ and thereafter by reversion of their excitation raising the tension across the traction motors to the full-load voltage.

As is shown for the machine $M_2$ only, the field coils 29 and 30 are each excited by current supplied by an amplidyne exciter A having a compensation winding 31 and a control field 32 connected across the rheostat 33. The load circuit of the amplidyne A contains a switch $S_7$ which is normally in the position $a$ but can be moved to the position $b$ whereby the field coils of the traction motors $T_1$ and $T_2$ are connected in the circuit of the amplidyne exciter. In the latter position of switch $S_7$ and of the corresponding switch in the amplidyne circuit (not shown) for the field coil 30, and with switches $S_3$ and $S_4$ closed and switches $S_5$ and $S_6$ open, the arrangement is connected for regenerative braking. In this case the traction motors, acting as generators, feed the machines $M_2$ and $M_3$ which, operating as direct-current motors, drive the converter $C_2$ which in its turn operates as a generator feeding power back into the line.

The two employed amplidyne exciters can be driven by a suitable auxiliary motor or can be directly coupled with the converter $C_2$.

It will be obvious that within the scope of the invention various modifications of the foregoing embodiments are possible. For instance, the traction motors need not be arranged in two groups but can all be connected in parallel; in this case the secondary transformer winding would have to be dimensioned for a correspondingly lower voltage, however, which would unfavourably affect the weight of the transformer. The shown connection, in which the secondary transformer winding has a center tap, has, moreover, the advantage that both halves of this winding are symmetrically loaded.

The use of a single three-wire direct-current machine according to Figure 1 likewise means a decrease of weight as compared with the arrangement of Figure 2 in which each group of traction motors has its own direct-current machine.

For the same reason, the main winding 6 of the phase converter is preferably adapted to as high a tension as possible so as to reduce the weight thereof.

Obviously, the converter and rectifier arrangement may have more than four phases by providing the former with suitable windings. Instead of separate ignitrons one may, of course, employ a single poly-anode rectifier of the known kind.

When it is desired to operate the traction motors over a larger voltage range with the aid of a smaller phase converter-generator set than above described with respect to Figures 1 and 2, it is possible to use a three wire rectifier arrangement, each half having a voltage of ⅔ of the ultimate full voltage across the motors, in combination with a direct-current machine for each group of traction motors, each machine having maximum ⅓ of said full-load voltage. It is then possible to raise the voltage of the motor groups up to ⅓ of their full voltage by feeding each group by its own direct-current machine. Thereafter, each motor group is connected in series with its direct-current machine to one half of the rectifier arrangement whereby the voltage can be raised from ⅓ to ⅔ of their full-load voltage. Finally, by connecting each group of motors with its direct-current machine to the full voltage of the rectifier arrangement the voltage can be raised from ⅗ to ⅗ of their full-load voltage.

It will be clear that in a similar way various other combinations of fixed rectifier voltages and regulable direct-current machine voltages can be obtained to meet various operating requirements.

What is claimed is:

1. Driving arrangement for electric traction purposes comprising a high tension single-phase alternating current supply line, a main transformer for stepping down the voltage of the supply line and having a primary and a secondary winding, means for connecting the primary of said transformer to said supply line, at least one rotary phase converter connected to and fed by said transformer and having at least one phase shifting winding adapted to form a poly-phase current supply system in combination with the secondary winding of said transformer, polyphase rectifier means connected to and fed by said polyphase supply system, at least one direct-current machine adapted to selectively run as a motor and a generator mechanically coupled with said phase converter and provided with voltage regulating means, at least one group of direct-current traction motors, and switch means allowing said rectifier arrangement and direct-current machine to be connected in series across said group of traction motors.

2. Driving arrangement according to claim 1, in which the voltage regulating means of the direct-current machine comprises a variable resistance in series with at least one field coil of said machine so as to permit the voltage of the latter to be regulated from zero to maximum in two directions, thereby raising or lowering, respectively, the constant direct-current voltage of the rectifier arrangement when connected in series therewith.

3. Driving arrangement for electric traction purposes adapted to be fed from a high tension single-phase alternating current supply line, comprising a main transformer for stepping down the voltage of the supply line, at least one rotary phase converter fed by said transformer and having at least one phase shifting winding adapted to form a polyphase current supply system in combination with the secondary winding of said transformer, a polyphase rectifier arrangement fed by said polyphase supply system, at least one direct-current machine mechanically coupled with said phase converter and provided with voltage regulating means, at least one group of direct-current traction motors, said rectifier arrangement having a constant output voltage which equals two-thirds of the full-load voltage of the group of traction motors and the voltage of said direct-current machine being regulable by said regulating means in two directions between zero and a maximum of one-third of said traction motor full-load voltage, and switch means allowing either to connect said direct-current machine by itself across the group of traction motors for feeding the latter with a voltage varying between zero and one-third of its full-load voltage, or to connect said direct-current machine and said rectifier arrangement in series across said group of traction motors for feeding the latter with a voltage varying between one-third and its full-load voltage.

4. Driving arrangement for electric traction purposes adapted to be fed from a high tension single-phase alternating current supply line, comprising a main transformer for stepping down the voltage of the supply line, at least one rotary phase converter fed by said transformer and having at least one phase shifting winding adapted to form a polyphase current supply system in combination with the secondary winding of said transformer, a polyphase rectifier arrangement fed by said polyphase supply system, two regulable sources of direct-current of opposite polarity derived from at least one direct-current machine mechanically coupled with said phase converter, two groups of direct-current traction motors, and switch means adapted to connect each one of said groups in series with the one or the other of said sources of direct-current, respectively, between the one or the other output terminal, respectively, of said rectifier arrangement and the neutral point of said polyphase alternating current system.

5. Driving system according to claim 4, in which said two sources of direct-current are obtained from a single-three-wire machine having its neutral wire connected to said neutral point.

6. Driving arrangement for electric traction purposes adapted to be fed from a high tension single-phase alternating current supply line, comprising a main transformer for stepping down the voltage of the supply line and having a center tap on its secondary side, at least one rotary phase converter having a high tension winding fed by said transformer and at least one phase shifting winding of lower tension adapted to form a polyphase current supply system in combination with the secondary terminals of said transformer, said center tap forming the neutral point of said polyphase system, a polyphase rectifier arrangement fed by said polyphase supply system, at least one direct-current machine adapted to selectively run as a generator and a motor mechanically coupled with said phase converter and provided with voltage regulating means, at least one group of direct-current traction motors, and switch means allowing said rectifier arrangement and direct-current machine to be connected in series across said group of traction motors.

References Cited in the file of this patent

UNITED STATES PATENTS 2,465,226     Harris _____ Mar. 22, 1949